United States Patent [19]
Raque

[11] 3,908,342
[45] Sept. 30, 1975

[54] HEAT SEALING MACHINE
[75] Inventor: Glen F. Raque, Louisville, Ky.
[73] Assignee: FMC Corporation, San Jose, Calif.
[22] Filed: Oct. 26, 1973
[21] Appl. No.: 409,999

[52] U.S. Cl. .................. 53/329; 83/326; 198/131
[51] Int. Cl.² .......................................... B65B 7/28
[58] Field of Search ........ 53/39, 112 A, 112 R, 184, 53/329, 282; 83/326, 346, 347; 156/582; 198/131

[56] References Cited
UNITED STATES PATENTS

| | | | |
|---|---|---|---|
| 3,001,348 | 9/1961 | Rado | 53/373 X |
| 3,068,933 | 12/1962 | Klar | 156/582 |
| 3,343,336 | 9/1967 | Bradford | 53/329 |
| 3,436,894 | 4/1969 | Sorensen | 53/373 X |
| 3,553,930 | 1/1971 | Anderson et al. | 53/329 X |
| 3,587,829 | 6/1971 | Sorensen | 198/131 |
| 3,706,183 | 12/1972 | Talarico | 53/329 |
| 3,708,954 | 1/1973 | Wilke et al. | 53/329 |
| 3,851,445 | 12/1974 | Schuh | 53/329 |

Primary Examiner—Robert L. Spruill
Attorney, Agent, or Firm—C. E. Tripp

[57] ABSTRACT

A machine for applying a heat sealable cover onto disposable food trays having continuous, laterally projecting upper flanges. A series of trays are continuously moved, in each of multiple processing lanes, under a thermoplastic transparent web which is heated by a presser roll into adhering contact with the flanges on the trays. Two adjacent trays have their flanges supported by a transverse conveying flight which is grooved, intermediate the flanges, to provide operating clearance for a rotary knife assembly. A toothed knife thereof punctures and severs the web, and leaves free corner tab portions because the flanges are rounded at the corners so that each tray downstream of the rotary knife assembly is an individual unit having a heat sealed, transparent cover wherein the cover can be readily stripped by peeling back one of the free tab portions.

4 Claims, 4 Drawing Figures

FIG_1

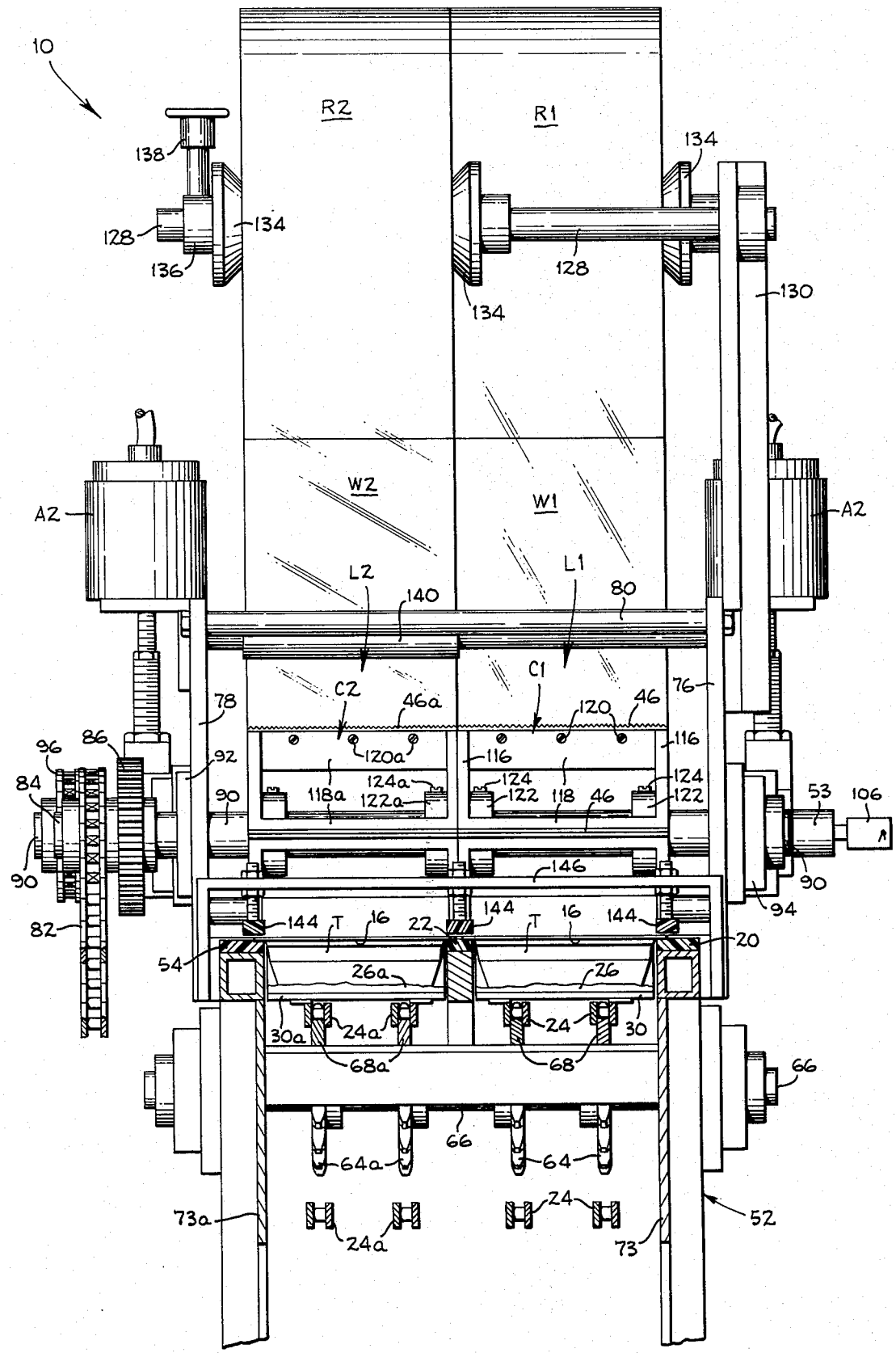

HEAT SEALING MACHINE

BACKGROUND OF THE INVENTION

The field of the present invention concerns heat sealing machines for applying a thermoplastic cover, or a material having a thermoplastic coating, onto the perimeter of a disposable food tray.

Prior art heat sealing machines of the general type indicated usually operate with intermittent motion of the article which is to have the thermoplastic material applied, and with reciproating motion for those parts which apply and heat seal the material to the article.

It is well known that reciprocating and intermittent motion, in terms of production rates, are inherently self-limiting because of the difficulty of rapidly starting and stopping a variety of structural elements. Moreover, precise timing is difficult to maintain, the problems of wear are accelerated, and the components are usually more complex than when employing continuous rotary motion and conveying movement.

In the specific problem to which the present invention is directed, a filling line produces a multiple lane output of filled plastic food trays at a relatively high rate, such as in the order of 300 trays per minute. Each tray must be effectively sealed with a cover, preferably transparent and easily removable to provide consumer appeal, and discharged as a complete individual unit. In addition to the high handling rate required, another problem is that the trays are usually provided with compartments having different food products. It is thus a further object that the cover is also sealed to the periphery of each compartment, as well as to the outer periphery of the tray, so that the foods and their vapors are isolated in their respective compartments.

SUMMARY OF THE INVENTION

By supporting each food tray on all sides by its laterally projecting flange or lip, and feeding a continuous thermoplastic web over a lane of the thus supported trays so that the continuously moving web and trays pass successively under a downwardly biased, heated presser roll, the web is sealed to the tray flanges. The transverse support flights for the tray flanges are provided with a groove or recess, and a rotary cutting knife unit immediately downstream of the presser roll inserts a toothed knife downwardly into each passing groove so that the interposed web is first punctured and then severed. Since the web is cut along a linear line and the trays have rounded corners, a free tab portion of the cover material is formed at each of the corners of the tray, thus providing a grip to later manually peel the cover from the tray.

BRIEF DESCRIPTION OF THE DRAWINGS

FIG. 4 is an enlarged transverse section taken along lines 4—4 on FIG. 2.

DESCRIPTION OF A PREFERRED EMBODIMENT

Figure 1:
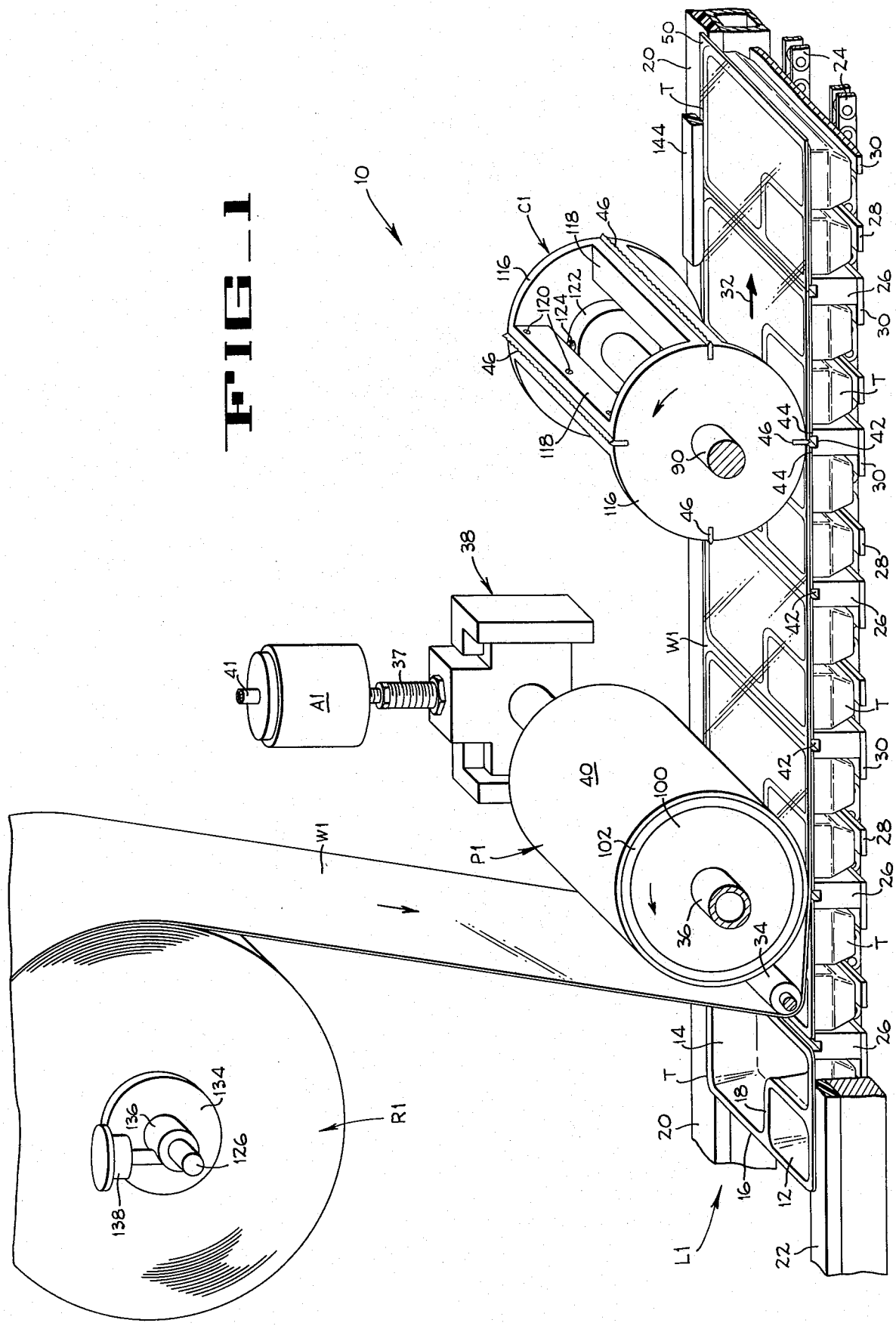
FIG. 1 is a diagrammatic perspective illustrating the major operating components of a single processing lane of the heat sealing machine, and the operational steps performed by those components.

First with reference to FIG. 1, a typical food tray T which is adapted to be handled in the heat sealing machine 10 is constructed, for example, of vacuum-drawn plastic to form separate food compartments 12 and 14. Extending around the perimeter of the tray is an uninterrupted flange or lip 16, which is planar and merges with a flange 18 that lies between the compartments 12 and 14. While the detailed arrangement of the other parts of the tray T are immaterial for the purpose of this description, it should be noted that there is a free access to the underside of the flange 16 so that substantially the entire flange can be supported from beneath.

The operating principles apart from the structural details of the heat sealing machine 10 are briefly outlined with reference to a processing lane L1 in FIG. 1, and the same principles apply to both processing lanes L1 and L2 of the machine. Conveying means for the trays T include longitudinal support rails 20 and 22 which support the tray flanges 16 at each side of the tray. Intermediate the support rails is a pair of continuously driven chains 24 which are spanned by spaced support bars or flights 26 that support the leading and trailing tray flanges 16. Both the tray support flights 26 and the tray-supporting surfaces of the support rails 22 are preferably formed of plastic material, as shown, which is heat-resistant and has a low coefficient of sliding friction. Each tray is thus confined to a moving pocket defined by the rails 20 and 22, and the flange support flights 26. In addition to the support given to the trays by the rails and support flights, the bottom wall of each tray rests upon lateral bottom support bars 28 and 30. The flights 26 are secured to the bars 30, and both sets of bars 28 and 30 are connected to the chains 24.

During their conveying movement in the direction of the arrow 32, the trays T move successively under a web supply roll R1, a heated presser roll P1, and a cutting knife unit C1. A web W1 of thermoplastic material extends from the supply roll R1 under a guide roller 34 which is closely spaced from the tray flanges 16, and thence under the presser roll p1 and over the other downstream trays T.

A two-part shaft 36 supports the presser roll P1, and as shown at one end of the shaft 36 in FIG. 1, an air cylinder A1 is provided with a piston rod 37 that is coupled to the shaft via an intermediate slide block assembly 38. In known manner, the slide block assembly accommodates limited vertical movement of the shaft 36. An internal spring in the air cylinder biases the shaft 36 upward so that a rubber sleeve 40 on the presser roll is spaced from the web W1 when the operation of the heat sealing machine is interrupted. During operation of the machine, the air cylinder A1, and a companion air cylinder A1 (FIG. 3) on the other end of the shaft 36, are energized through an inlet hose 41 to engage the rubber sleeve 40 with the web W1. The air pressure supply to the inlet hose 41 is provided through a common conduit, not shown, and is adjustable to regulate the contact pressure according to the composition of the web W1. Thermostatically controlled heat is generated within the presser roll P1, by later described structure, so that the web W1 is rendered tacky enough by the presser roll to be bonded to the tray flanges 16 and 18 when the heat, time and temperature factors are compatible with the web material being used.

Each transverse support flight 26 is provided with a coextensive central groove 42, this forming a land 44 at each side of the groove. The groove provides operating clearance for a toothed knife blade 46 on the cutting knife unit C1, and the lands provide support for the tray lip flanges on two adjacent trays T. Accordingly, the cutting knife unit C1 operates in timed relation with the support flights 26 such that a knife blade 46 descends into and advances with a groove 42, whereby the teeth on the blade first puncture, and then sever the web W1 across its total width. To provide operating clearance for the end portions of the knives, the support rails 20 and 22 are provided with notches, not shown, where the knives pass below the upper surfaces of the rails.

Each tray T is thus severed from the trailing or next upstream tray by the cutting knife unit C1, and is an individual, sealed unit having the food compartments isolated from each other and from the environment. The trays are then discharged for further handling operations, which in one example includes stacking the trays in baskets and delivering the baskets for institutional meals. It will be noted that the tray flanges 16 define rounded corners, and that the knife blades 46 are linear. By this means, the web portions overhanging each corner provide free access tabs 50, one of which can be peeled back from the tray to peel off the entire cover.

Figure 2:
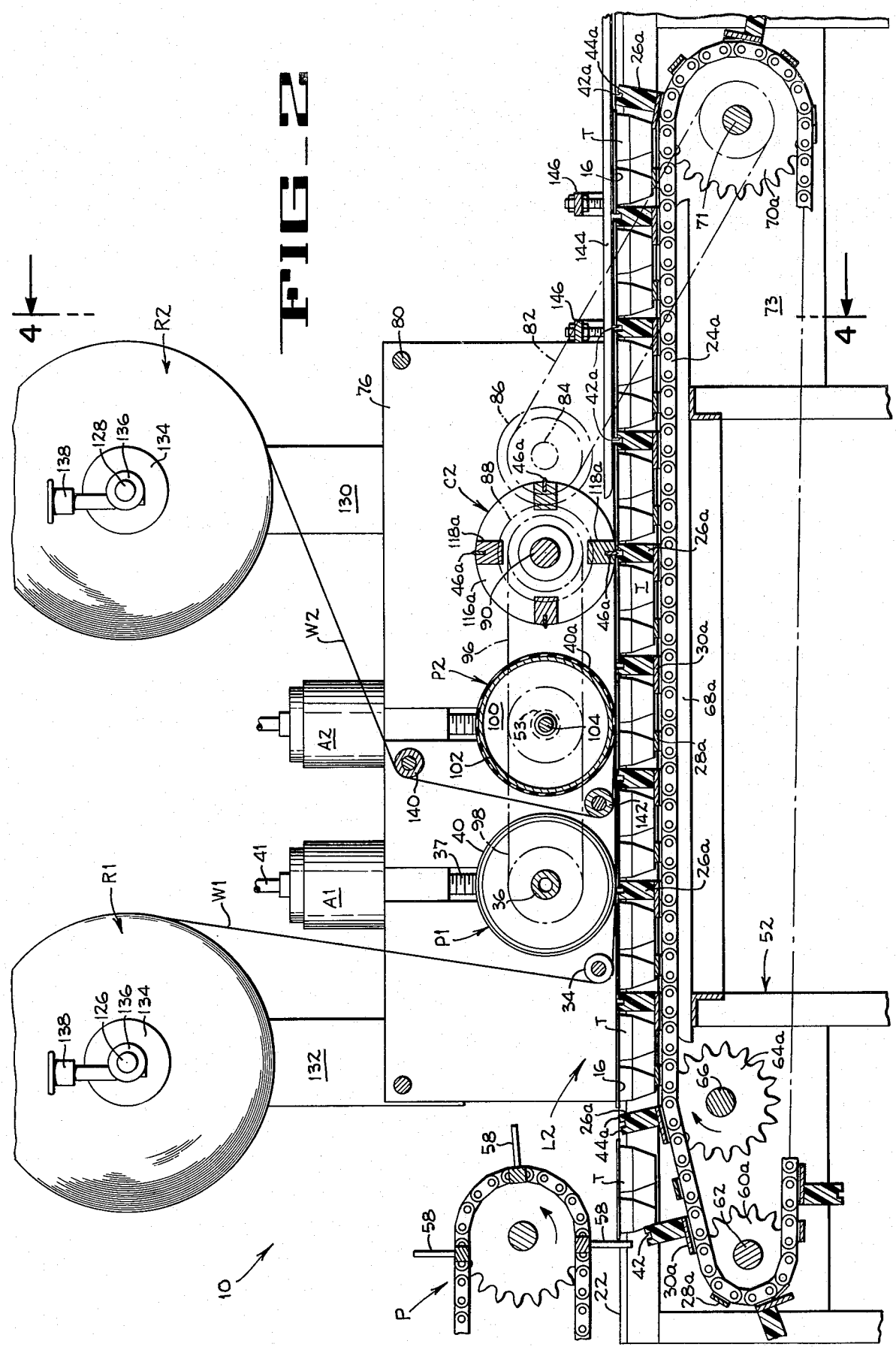
FIG. 2 is a vertical section through one lane of the heat sealing machine of the present invention, taken along a line immediately under the near frame members.
Figure 3:
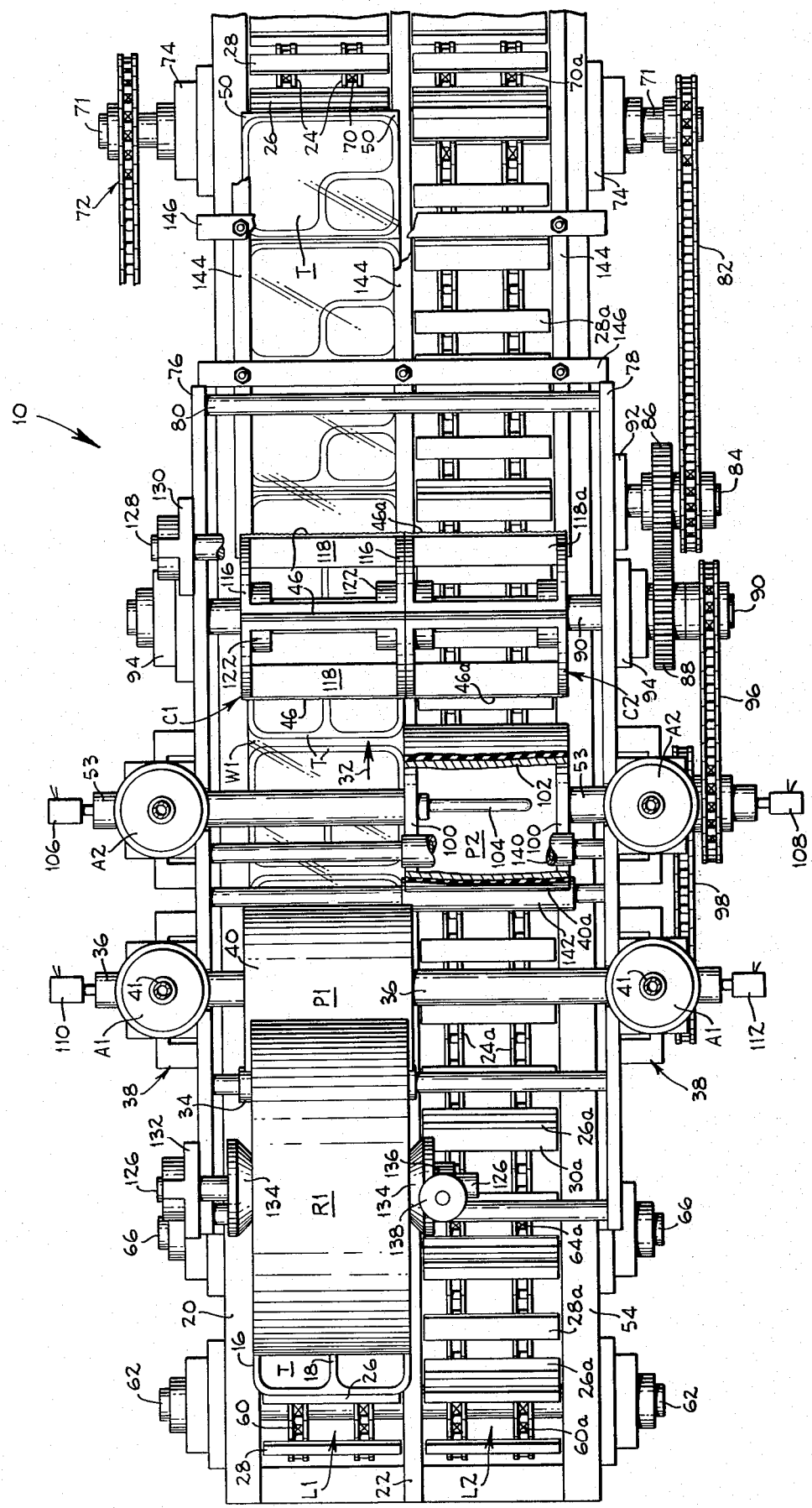
FIG. 3 is a plan of the machine shown in FIG. 2, certain of the parts being broken away to show structure which would be otherwise concealed; one processing lane is shown complete with a web supply roll and with a continuous series of food trays, while the other processing lane is shown in empty condition with the web supply roll removed.

With more specific reference to structural details and features of the heat sealing machine 10 (FIG. 2), a fabricated frame 52 supports the previously mentioned tray support rail 22, which extends along the longitudinal centerline for the length of the machine, and is arranged to also support the flanges of the trays in an adjacent processing lane L2 (FIG. 3). The lane L2 (FIG. 2) is provided with a web supply roll R2 for storing a web W2, a presser roll P2 actuated by an air cylinder A2 on a two part shaft 53, and a cutting knife unit C2. Similarly, the lane L2 includes a support rail 54 which functions in the same way as the support rail 22 to support the outboard flanges of trays T.

The other parts associated with the lane L2 that are the same as those mentioned in connection with lane L1 retain the same reference numerals with the suffix a. Other than a longitudinally offset relation for the supply rolls R1 and R2, and for the presser rolls R1 and R2 to facilitate construction and operation of the machine, the two processing lanes L1 and L2 are alike, and the following description, directed primarily to the structure for lane L1, is typical of the other lane.

At the inlet end of the heat sealing machine 10 (FIG. 2), the trays T are fed into position between the adjacent flange support bars or flights 26 and 26a by associated apparatus, such as pusher flights 58 on an overhead pusher conveyor P, for example. From the inlet end of the machine 10, the flights 26 and 26a incline upward from idler sprockets 60 and 60a, on a shaft 62, so that the flights ascend relative to the trays T, and the feed path of the trays remains level to avoid spillage. At the top of the inclined path, the feed chains 24 and 24a pass over idler sprockets 64 and 64a, mounted on a shaft 66, and are then supported and guided by chain tracks 68 and 68a to drive sprockets 70 and 70a on a power input shaft 71. In order to time the operation of the present apparatus with the pusher conveyor P, it is convenient to drive the power input shaft 71 from the pusher conveyor, or to drive both units from a common power source. Only a chain and sprocket drive input 72 (FIG. 3) is illustrated herein, since the drive can take different forms requiring only ordinary skill, and because its details do not directly concern the present invention.

The power input shaft 71 is rotatably mounted in bearings 74 on upstanding frame plates 73 and 73a (FIG. 4). For rotating the presser rolls P1 and P2, and for rotating the cutting units C1 and C2 in timed relation to the conveyor flights 26 and 26a, a chain and sprocket drive 82 (FIG. 3) couples the shaft 71 to a stub shaft 84. A gear 86 on the shaft 84 is meshed with a gear 88 to counterrotate a mounting shaft 90, for the cutting knife units C1 and C2, relative to the direction of rotation of the shaft 60. A bearing 92 for the stub shaft 84, and bearings 94 for the cutting knife units, are mounted on the outer faces of spaced frame plates 76 and 78 interconnected by tie rods 80. To drive the presser rolls P1 and P2, the cutting knife shaft 90 is connected by a chain and sprocket drive unit 96 to the presser roll shaft 53, and the latter is connected by a chain and sprocket drive unit 98 to the presser roll shaft 36.

As is clearly shown in FIG. 2, the chain and sprocket drive units 82, 96 and 98 have sprockets of equal diameter mounted on the drive input shaft 71, and on the driven shafts 36, 53 and 90. Also, the gears 86 and 88, respectively mounted on the shafts 84 and 90, are of equal diameter. Accordingly, each individual drive ratio from the shaft 71 to the shafts 36, 53 and 90 is 1:1. Further, FIG. 2 clearly discloses that the pitch diameter of the drive sprocket 70a is the same dimension as the outside diameters of the presser rolls P1 and P2 (and the same dimension as the diameter of the circular flange 116a of the cutting unit C2). It is evident, therefore, that the peripheral speeds of the presser rolls P1 and P2 are equal and are the same as the linear velocity of the chain flights 26 and 26a, and of the trays T.

With reference to the presser rolls P1 and P2 (FIGS. 2 and 3) it will be noted that the two-part shafts 36 and 53 are tubular. Considering the shafts 53 and the presser roll P2, a disc 100 is secured to each shaft and fastened to a cylindrical shell 102 which is covered by the rubber sleeve 40a. One disc 100 carries a resistance heating element 104, the connecting wires of which extend through the adjacent hollow shaft 53 and are connected to a stationary junction box 106 that maintains an electrical connection to the heating element. Similarly, the other hollow shaft 53 carries electrical wires to a junction box 108 for providing an electrical connection to a thermostat, not shown, which is mounted in the presser roll for controlling the heating element 104, and thus the surface temperature of the rubber sleeve 40a. Junction boxes 110 and 112 for the presser roll P1 function in the same manner to controllably heat the sleeve 40.

The cutting knife units C1 and C2, best shown in FIG. 4, are individual units which can, if desired, be locked on the shaft 90 in rotationally offset relation to provide a different delivery pattern. Thus, a structural feature is that both lanes L1 and L2 need not simultaneously discharge covered trays; by longitudinally offsetting the chains 24 and 24a, rotationally offsetting the cutting units C1 and C2, and providing input pusher flights 58 which are individual to each processing lane L1 and L2, any desired staggered discharge of trays can be obtained for associated processing machines requiring a staggered delivery order.

A further structural feature is that because the components associated with one processing lane are separate from the components of the other, it is possible to handle trays having two different cover materials, provided that they are segregated into separate files for the lanes L1 and L2. For example, one lane of trays might be covered with foil having a thermoplastic coating which, by adjusting the sealing or bonding temperature of the presser roll, would satisfactorily seal in the same time period used for the cover material in the other lane.

While listing the possible variations of structure within the purview of the present invention, it should also be mentioned that the presser rolls P1 and P2 can be mounted on a common shaft, with somewhat more complicated routing of the electrical wires to the thermostats and heating elements. Another two lane heat sealing machine could then be mounted beside the machine 10, with similarly aligned presser rolls opposite the omitted presser roll. In other words, the two presser rolls P1 and P2 could be mounted on the shaft 53, and another two presser rolls for two added processing lanes could be laterally offset from, aligned with, and driven by the shaft 36.

The cutting unit C1 (FIG. 4) is in the form of a cylindrical cage and includes a pair of spaced circular flanges 116 having four equally spaced connecting bars 118. An outwardly open groove in each connecting bar carries one of the knife blades 46 which is locked in place by set screws 120. Since the grooves 42 (FIG. 1) in the flights 26 are deep relative to the plane of the web W1, there is no critical adjustment necessary for the knife blades 46. In order to rotationally offset the cutting knife units C1 and C2 as previously mentioned, the flanges 116 are provided with bosses 122 and set screws 124 for locking the units C1 and C2 on their mounting shaft 90.

To condition the heat sealing machine 10 for operation, the supply rolls R1 and R2 of web material are mounted on support shafts 126 and 128, respectively, that extend over the lanes L1 and L2 from standards 130 and 132. Each supply roll is cradled by free conical rollers 134, the outermost of which is held by a collar 136 having a wheel-operated lock 138. The web W1 is fed under the idler roll 34 and the presser roll P1, which is heated but raised from the tray therebeneath by the internal springs in the air cylinders A1. Similarly, the web W2 is fed around idler rollers 140 and 142 (FIG. 2) and under the presser roll P2. From that point on, all that remains is to apply air to the air cylinders A1 and A2, and initiate movement of the conveying chains 24 and 24a to advance each lane of trays under their respective presser rolls and cutting knife units. After adjusting the pressure with which the presser rolls urge the webs onto the trays for the particular web material being used and for the conveying speed of the trays, the webs are continuously sealed to the trays and drawn from the supply rolls. Thus, the webs are continuously engaged by the presser rolls and bonded to the flanges on the trays so that one tray is connected to the other by the web. As each knife blade 46 descends to bottom dead center, it aligns with the groove 42 along a transverse line between two adjacent trays T, and first punctures, then severs the web with its cutting teeth to separate the trays. To prevent the downward pressure of the cutting knives 46 from lifting the remote ends of the two trays which it separates, the lateral lips of the leading tray are disposed beneath three hold-down bars 144 (FIGS. 2-4) which are suspended over the slide rails 20, 22 and 54 by overhead brackets 146 of inverted U-shape which are fastened to the frame 52. Each lane L1 and L2, at the discharge end of the machine adjacent the input drive shaft 71, thus comprises individual trays ready for processing by other, associated apparatus, and the discharge rate, according to the web material employed for the covers, can be as high as in the order of 150 trays per minute, per lane because there are no reciprocating components, and no intermittent motion.

Although the best mode contemplated for carrying out the present invention has been herein shown and described, it will be apparent that modification and variation may be made without departing from what is regarded to be the subject matter of the invention.

What is claimed is:

1. Apparatus for applying covers to peripherally flanged trays, said apparatus being of the type which comprises conveyor means for advancing a series of spaced trays, means for applying and sealing a cover web to the tray flanges, and knife means for severing the cover web between adjacent trays; the improvement wherein said conveyor means comprises fixed, laterally spaced longitudinal rails for slidably supporting the side flanges of each tray, an endless moving conveyor having a reach that passes between said rails, and transverse flights on said conveyor, the upper surfaces of said flights being flush with the upper surfaces of said rails along said conveyor reach for supporting the end flanges of adjacent trays, each of said flights being formed to provide a full length recess for receiving a blade of said web severing knife means.

2. In a packaging machine of the type including a tray conveyor for supporting a file of trays having peripheral upper flanges, said conveyor advancing the trays along with a continuous covering web past sealing and cutting stations where the web is sealed to the tray flanges and is then transversely severed to produce individual covered trays, the improvement wherein said tray conveyor comprises a pair of driven endless chains, a plurality of equally spaced transverse flights interconnecting said chains for supporting the trailing and leading flanges of adjacent trays carried by the upper reach of said chains, each of said transverse flights having an upwardly open longitudinal recess intermediate the confronting edges of adjacent tray flanges for receiving a knife blade that severs the covering web, and a fixed support rail at each side of said upper conveyor reach having an upper surface for slidably supporting the lateral flanges of said trays.

3. In a multiple lane heat sealing machine including two side by side continuously driven chain conveyors each having an upper reach for advancing a file of trays having horizontally projecting peripheral flanges, the improvement comprising a common fixed support rail between and parallel to said conveyors for slidably supporting the longitudinally extending inner flanges of laterally adjacent trays, a fixed support rail at the side of each conveyor for supporting the outer longitudinal tray flanges, a plurality of spaced transverse flights mounted on the chains of each conveyor, each of said flights supporting both the leading and trailing flanges of adjacent trays and having an upwardly open grove intermediate said flanges, means for supplying a cover web for the trays on each conveyor, a presser roll mounted over each of said conveyors for bonding the associated web onto the flanges of underlying trays, an overhead knife drum mounted downstream of each presser roll on a common driveshaft extending over both of said conveyors, and a plurality of knife blades carried by each knife drum for movement in a circular path downward into said support flight grooves for severing the cover webs between successive trays.

4. A heat sealing machine comprising a continuously driven tray conveyor for trays having a planar peripheral flange around a receptacle, a pair of laterally spaced fixed longitudinal rails for slidably supporting the lateral flanges of said trays, transverse flights movable with said conveyor extending between said longitudinal rails for supporting the leading and trailing flanges of the trays, said flights each having a longitudinal central groove opening to its upper surface and disposed between the confronting flanges of two adjacent trays, a heated presser roll having a lower surface substantially coincident with the upper surfaces of said rails, means for supplying a continuous web of thermoplastic material intermediate said presser roll and the trays in covering relation with said tray flanges, said presser roll heating and intimately engaging the web with said tray flanges to bond the web to said flanges, a plurality of knife blades, and means mounting said knife blades for movement in a circular path downward into each passing groove in said support flights to sever the web intermediate each two adjacent trays.

* * * * *